(12) United States Patent
Oyama

(10) Patent No.: US 10,091,420 B2
(45) Date of Patent: Oct. 2, 2018

(54) LIGHT-EMISSION CONTROL APPARATUS AND METHOD FOR THE SAME

(71) Applicant: CANON KABUSHIKI KAISHA, Tokyo (JP)

(72) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 15/206,763

(22) Filed: Jul. 11, 2016

(65) Prior Publication Data

US 2017/0019597 A1 Jan. 19, 2017

(30) Foreign Application Priority Data

Jul. 16, 2015 (JP) ................................. 2015-142506

(51) Int. Cl.
*H04N 5/225* (2006.01)
*H04N 5/232* (2006.01)
*H04N 5/235* (2006.01)

(52) U.S. Cl.
CPC ....... *H04N 5/23245* (2013.01); *H04N 5/2354* (2013.01); *H04N 5/23212* (2013.01); *H04N 5/23219* (2013.01); *H04N 5/2256* (2013.01)

(58) Field of Classification Search
CPC ............. H04N 5/2256; H04N 5/23212; H04N 5/23219; H04N 5/23245; H04N 5/2354
See application file for complete search history.

(56) References Cited

U.S. PATENT DOCUMENTS

| 8,692,930 | B2* | 4/2014 | Rolston | A46B 7/04 348/370 |
| 2007/0002157 | A1* | 1/2007 | Shintani | H04N 5/23216 348/333.06 |
| 2011/0052139 | A1* | 3/2011 | Oku | H04N 5/23293 386/224 |
| 2013/0250158 | A1* | 9/2013 | Yamauchi | H04N 5/23293 348/333.06 |
| 2015/0085157 | A1* | 3/2015 | Yamaguchi | H04N 5/2252 348/223.1 |
| 2015/0124123 | A1* | 5/2015 | Wu | H04N 5/2354 348/234 |

(Continued)

FOREIGN PATENT DOCUMENTS

JP 2013-74428 A 4/2013
JP 2014-142376 A 8/2014

*Primary Examiner* — Daniel M Pasiewicz
(74) *Attorney, Agent, or Firm* — Canon U.S.A., Inc. IP Division

(57) ABSTRACT

A light-emission control apparatus includes a shooting-mode selecting unit, a focus detecting unit, a light emitting unit, and a control unit. The shooting-mode selecting unit is configured to be capable of selecting at least a first shooting mode in which a predetermined correction is applied to a human face of a captured image or a second shooting mode different from the first shooting mode. The focus detecting unit is configured to detect a focus. The light emitting unit is configured to emit assist light toward a subject while the focus detecting unit is detecting the focus. The control unit is configured to control an amount of emission of the assist light in the first shooting mode to a smaller amount than an amount of emission of the assist light in the second shooting mode.

30 Claims, 9 Drawing Sheets

(56) References Cited

U.S. PATENT DOCUMENTS

2015/0138321 A1* 5/2015 Yamamoto ......... H04N 13/0221
      348/46
2015/0172553 A1* 6/2015 Nonaka ................. G03B 17/04
      348/333.06

* cited by examiner

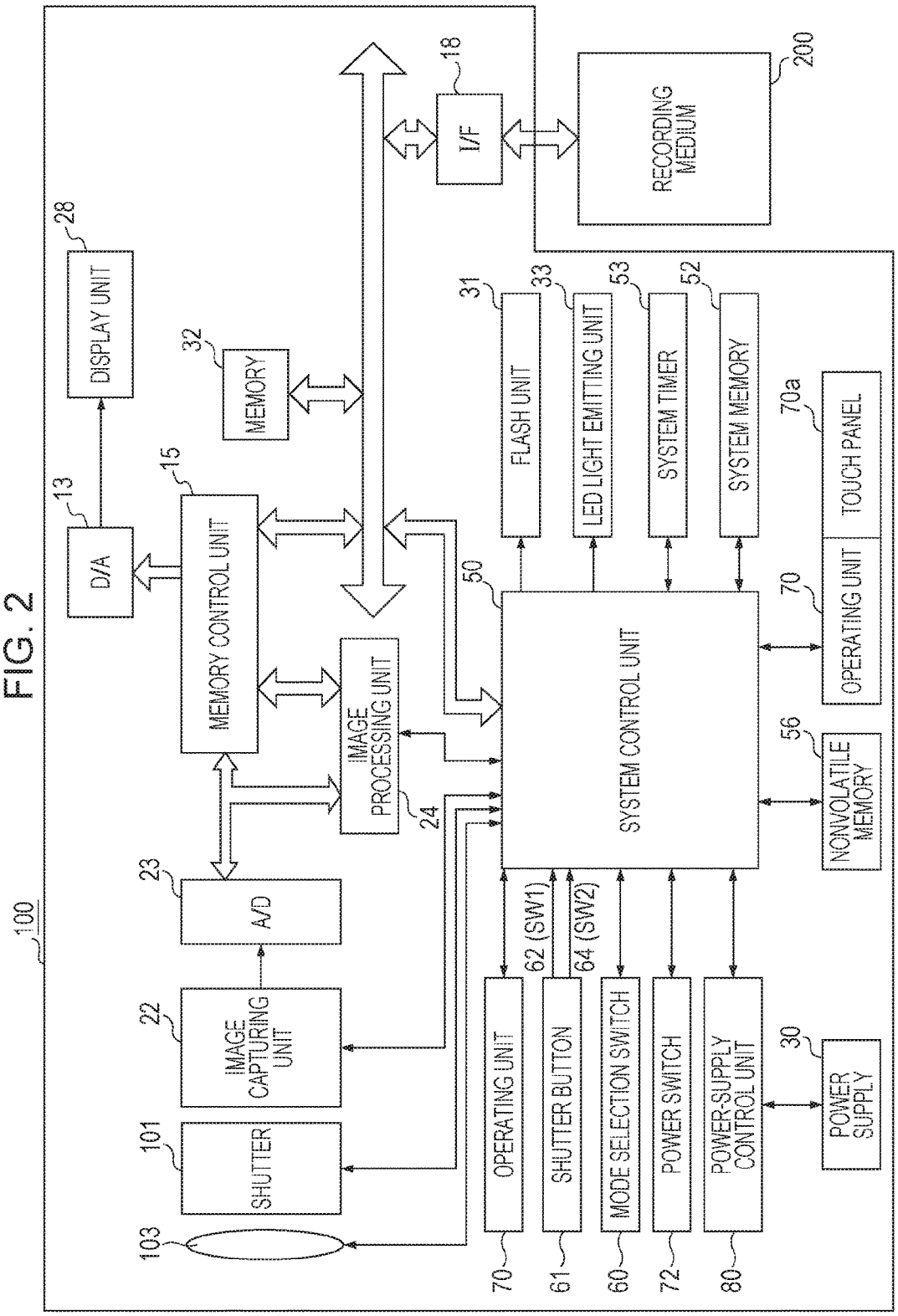

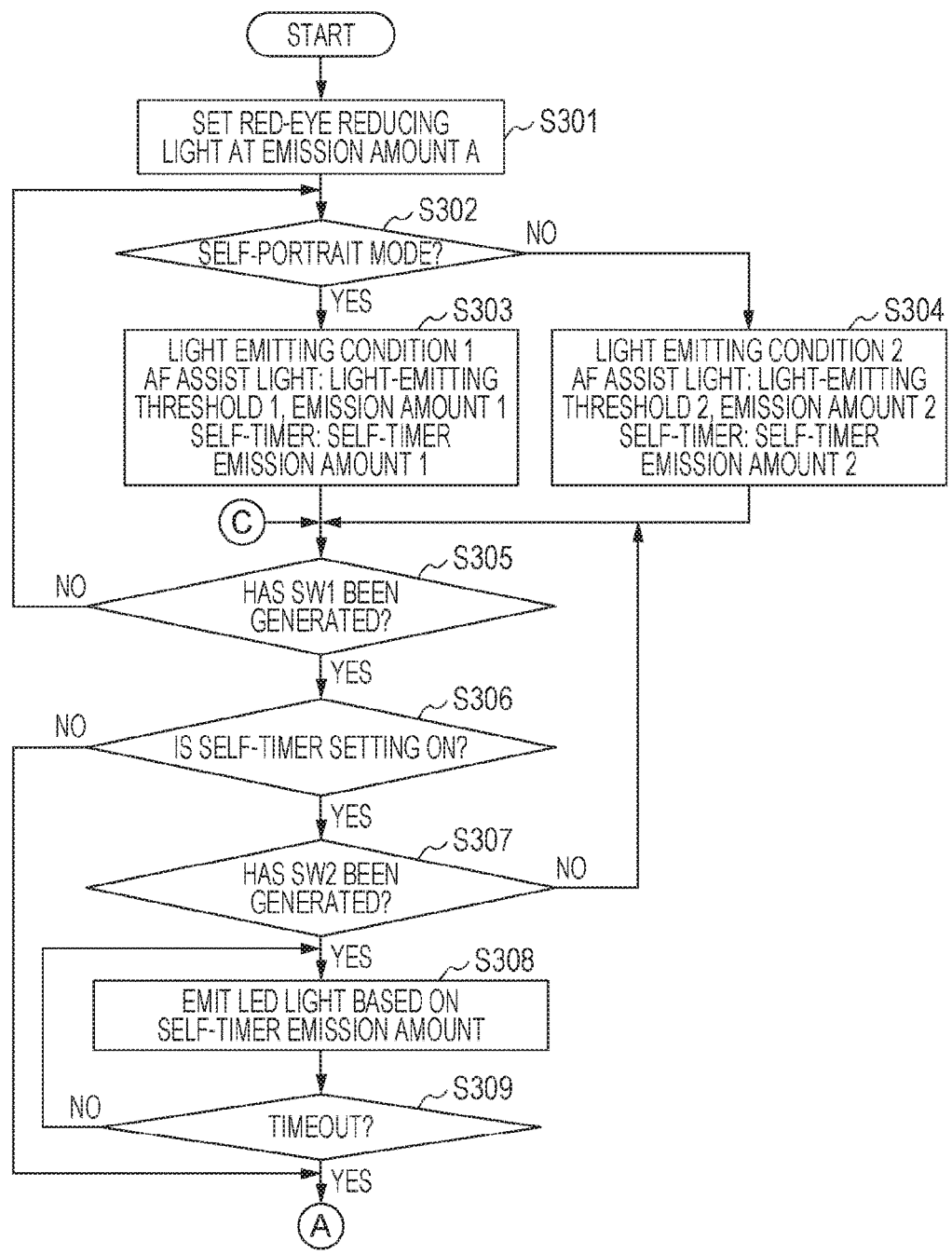

LIGHT-EMISSION CONTROL APPARATUS AND METHOD FOR THE SAME

BACKGROUND OF THE INVENTION

Field of the Invention

The present invention relates to a light-emission control apparatus and a method for the same, and more particularly, to a technique for controlling light emission for shooting.

Description of the Related Art

It is becoming common to take a self-portrait photograph (a selfie), for example, with a monitor pointed at the subject, and a self-portrait mode (a selfie mode), which is a shooting mode suitable to take a selfie, has appeared. Japanese Patent Laid-Open No. 2013-74428 proposes setting an image capturing apparatus to a self-portrait mode to meet shooting conditions suitable for taking a selfie on condition that the distance from the image capturing apparatus to the subject is within a predetermined distance. In shooting, flash light, red-eye reducing light, autofocus (AF) assist light, or self-timer flash light is sometimes emitted. Japanese Patent Laid-Open No. 2014-142376 proposes determining whether AF assist light has reached the subject and performing focus adjusting control according to the determination.

When a user takes a self portrait in a self-portrait mode at close range using a camera including an image capturing unit and a light emitting unit, as disclosed in Japanese Patent Laid-Open No. 2013-74428, emitting AF assist light for focus detection, as disclosed in Japanese Patent Laid-Open No. 2014-142376, may dazzle the user. However, good focus detection would not be performed without the AF assist light.

SUMMARY OF THE INVENTION

The present invention provides a light-emission control apparatus that improves the ease of shooting by suitably adjusting the amount of light, emission during shooting.

The present invention provides a light-emission control apparatus including a shooting-mode selecting unit, a focus detecting unit, a light emitting unit, and a control unit. The shooting-mode selecting unit is configured to be capable of selecting at least a first shooting mode in which a predetermined correction is applied to a human face of a captured image or a second shooting mode different from the first shooting mode. The focus detecting unit is configured to detect a focus. The light emitting unit is configured to emit assist light toward a subject while the focus detecting unit is detecting the focus. The control unit is configured to control an amount of emission of toe assist light in the first shooting mode to a smaller amount than an amount of emission of the assist light, in the second shooting mode.

The present invention provides a light-emission control apparatus including a shooting-mode selecting unit, a focus detecting unit, a light emitting unit, and a control unit. The shooting-mode selecting unit is configured to be capable of selecting at least a first shooting mode for taking a picture of a person at close range or a second shooting mode different from the first shooting mode. The focus detecting unit is configured to detect a focus. The light emitting unit is configured to emit assist light toward a subject while the focus detecting unit is detecting the focus. The control unit is configured to control an amount of emission of the assist light in the first shooting mode to a smaller amount than an amount of emission of the assist light in the second shooting mode.

The present invention provides a light-emission control apparatus including a detecting unit, a focus detecting unit, a light emitting unit, and a control unit. The detecting unit is configured to be capable of detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit. The focus detecting unit is configured to detect a focus. The light emitting unit is configured to emit assist light toward a subject while the focus detecting unit is detecting the focus. The control unit is configured, when a specific condition comprising that the detecting unit has detected that the display unit is at the first position is satisfied, to control an amount of the assist light emitted by the light emitting unit to a smaller amount than an amount of assist light emitted when the specific condition is not satisfied.

Further features of the present invention will become apparent from the following description of exemplary embodiments with reference to the attached drawings.

BRIEF DESCRIPTION OF THE DRAWINGS

FIG. 2 is a block diagram illustrating an example configuration of the digital camera according to the first embodiment.

FIG. 3A is a flowchart of a process in a shooting mode according to the first embodiment.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Embodiments of the present invention will be described hereinbelow with reference to the drawings.

First Embodiment

Figure 1A:
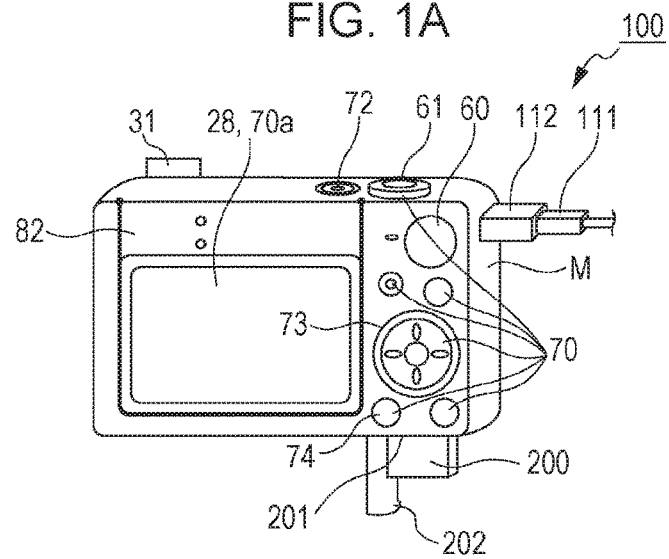
FIG. 1A is a back external view of a digital camera, which is an example of an apparatus to which the configuration of a first embodiment of the present invention is applicable.
Figure 1B:
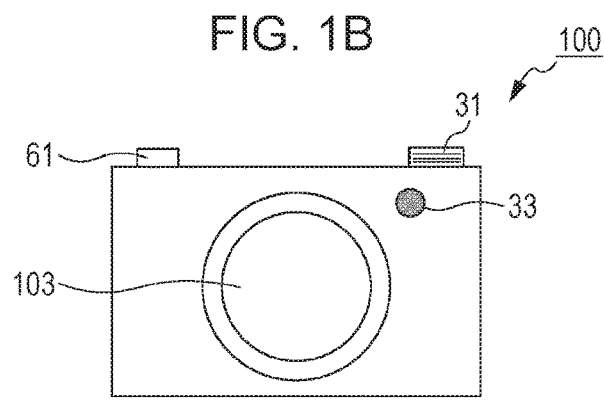
FIG. 1B is a front external view of the digital camera.
Figure 1C:
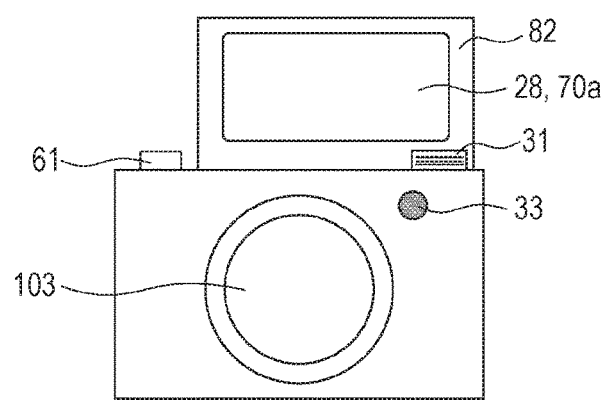
FIG. 1C is a front external view of the digital camera, with a panel unit reversed.

FIGS. 1A to 1C are external views of a digital camera 100, which is an example of a light-emission control apparatus of this embodiment. FIG. 1A is a back external view, FIG. 1B is a front external view, and FIG. 1C is a front external view when a panel unit 82 is reversed.

A display unit 28 is a display for displaying images and various pieces of information, on which a touch panel 70a that receives a touch operation is superposed. A shutter button 61 is an operating unit for giving a shooting instruction. A mode selection switch 60 is an operating unit for switching various modes. A connector 112 is a connector for connecting a connection cable 111 for connecting to, for example, a PC and a printer, to the digital camera 100. A menu button 74 is a button for displaying a menu screen. The menu screen allows the user to set automatic light emission ("auto"), always-on, or flash disabled ("flash not fired") for flash light emission. The menu screen also allows the user to set ON/OFF of AF assist light, a self-timer, and ON/OFF of red-eye reducing light. The AF assist light is light for AF processing (focus detection) performed to detect an in-focus position before exposure is performed, unlike flash light for exposure.

An operating unit 70 is an operating unit including various switches, buttons, and a touch panel for receiving various operations from the user. A controller wheel 73 is a rotatable operating member included in the operating unit 70. A power switch 72 is a push button for switching between power ON and OFF. A recording medium 200 is a nonvolatile recording medium, such as a memory card or a hard disk. A recording-medium slot 201 is a slot for holding the recording medium 200. The recording medium 200 held in the recording-medium slot 201 is capable of communicating with the digital camera 100, so that it can store and read data. A cover 202 is a cover of the recording-medium slot 201. FIG. 1A illustrates a state in which the cover 202 is open, and part of the recording medium 200 is taken out and exposed from the slot 201. The panel unit 82 is rotatably attached to the main body M of the digital camera 100 including the display unit 28. A flash unit 31 is a light emitting unit. When the flash unit 31 flashes in a dark place or against the sun, the subject can be photographed at an appropriate illuminance. When the "auto" mode is set in the menu screen, described above, the flash unit 31 flashes when the illuminance of the subject is lower than a predetermined level. When the "always-on" mode is set, the flash unit 31 flashes regardless of the illuminance of the subject. When the "flash not fired" mode is set, the flash unit 31 does not flash regardless of the illuminance of the subject.

An LED light emitting unit 33 in FIG. 1B is mounted to an imaging lens 103 side (adjacent to the subject). The LED light emitting unit 33 is used to notify the user of shooting timing with light in photographing using a self-timer (self-timer notification), to emit red-eye reducing light, and to emit autofocus (AF) assist light. The LED light emitting unit 33 emits red light. Alternatively, the LED light emitting unit 33 may emit green light, white light, orange light, or any other color light. The red-eye reducing light is emitted before the flash unit 31 flashes to prevent the eyes of the subject from coming out red (a red-eye effect) in shooting using the flash unit 31. The red-eye effect could decrease the quality of images. However, emitting the red-eye reducing light will reduce the red-eye effect. The AF assist light is emitted to a subject to detect an in-focus position when the illuminance of the subject is lower than a fixed level.

FIG. 1C illustrates a state in which the panel unit 82 is reversed with respect to the main body M, in which the image capturing direction of the imaging lens 103 and the display direction of the display unit 28 are the same (both of the imaging lens 103 and the display unit 28 face the subject). Changing the display direction of the display unit 28 in this manner allows the subject to take a picture while checking himself or herself. Thus, in self portrait photographing in which the subject himself/herself takes a picture (a selfie), the subject can take a picture while checking the angle and expression on the face, which facilitates capturing a desired image. Whether the panel unit 82 is at the reverse position can be determined by switching between ON and OFF of a switch (not shown) on the main body N according the reversing operation on the panel unit 82.

FIG. 2 is a block diagram illustrating an example configuration of the digital camera 100 according to this embodiment.

In FIG. 2, the imaging lens 103 is a lens group including a zoom lens and a focus lens. A shutter 101 is a shutter having an aperture function. An image capturing unit 22 is an image sensor, such as a COD and a CMOS device, which converts an optical image to an electrical signal. An analog-to-digital converter 23 converts an analog signal to a digital signal. The analog-to-digital converter 23 is used to convert an analog signal output from the image capturing unit 22 to a digital signal.

An image processing unit 24 performs predetermined pixel interpolation, resizing processing, such as reduction, and color conversion processing on data from the analog-to-digital converter 23 or data from the memory control unit 15. Furthermore, the image processing unit 24 performs predetermined calculation processing using acquired image data. A system control unit 50 performs exposure control and ranging control on the basis of the acquired calculation result. Thus, a through-the-lens (TTL) autofocus (AF) processing, automatic exposure (AE) processing, and electronic flash (EF, preflashing) processing are performed. The image processing unit 24 also performs TTL automatic while balance (AWB) processing on the basis of the acquired calculation result.

The data output from the analog-to-digital converter 23 is written to a memory 32 via the image processing unit 24 and the memory control unit 15 or is directly written to the memory 32 via the memory control unit 15. The memory 32 stores image data acquired by the image capturing unit 22 and converted to digital data by the analog-to-digital converter 23 and image data to be displayed on the display unit 28. The memory 32 has a storage capacity sufficient to store a predetermined number of still images, a predetermined time of moving images and audio.

The memory 32 is also used as a memory for displaying images (a video memory). A digital-to-analog converter 13 converts data for image display stored in the memory 32 to an analog signal and supplies the analog signal to the display unit 28. Thus, the display image data written to the memory 32 is displayed by the display unit 28 via the digital-to-analog converter 13. The display unit 28 presents a display according to an analog signal from the digital-to-analog converter 13 on a display, such as a LCD. Converting digital signals that are converted from analog signals by the analog-to-digital converter 23 and stored in the memory 32 to analog signals using the digital-to-analog converter 13 and transferring the analog signals to the display unit 28 one after another for display allows the display to function as an electronic view finder, enabling through image display (live view display).

A nonvolatile memory 56 is a recording medium serving as an electrically erasable and recordable memory, for example, an electrically erasable programmable read-only memory (EEPROM). The nonvolatile memory 56 is used to store constants and programs for operating the system control unit 50. The programs here are computer programs for executing flowcharts of this embodiment, described later.

The system control unit 50 controls the whole of the digital camera 100. By executing the programs recorded in the nonvolatile memory 56, described above, the processes of this embodiment are implemented. A random access memory (RAM) is used as a system memory 52. In the system memory 52, the constants and variables for operating the system control unit 50 and the programs read from the nonvolatile memory 56 are decompressed. The system control unit 50 also performs display control by controlling the memory 32, the digital-to-analog converter 13, and the display unit 28.

A system timer 53 is a timer that measures the time for use in various controls and the time of a built-in timepiece.

The mode selection switch 60, the shutter button 61, and the operating unit 70 are operating units for inputting various operating instructions to the system control unit 50.

The mode selection switch 60 switches the operation mode of the system control unit 50 to one of a still-image recording mode, a video shooting mode, a self-portrait mode, and so on (allows selection of a shooting mode). The mode selection switch 60 allows the user to directly switch these modes in the menu screen. Alternatively, after switching to the menu screen using the mode selection switch 60, the user can switch these modes in the menu screen using another operating member.

A first shutter switch signal 62 is turned ON when the shutter button 61 disposed on the digital camera 100 is halfway through operation, that is, half-pressed (an instruction to prepare shooting), to generate a first shutter switch signal SW1. In response to the first shutter switch signal SW1, AF processing, AE processing, AWB processing, and EF processing are started.

A second shutter switch signal 64 is turned on when the shutter button 61 completes in operation, that fully pressed (an instruction to start shooting) to generate a second shutter switch signal SW2. In response to the second shutter switch signal SW2, the system control unit 50 starts a series of shooting processing operations from reading signals from the image capturing unit 22 to writing image data to the recording medium 200. In a mode in which an effect is applied to the image, as in the self-portrait mode, an effect set by the user is applied to the image data read from the image capturing unit 22, and then the data is recorded in the recording medium 200.

A power-supply control unit 80 includes a buttery detecting circuit, a DC-to-DC converter, and a switch circuit that switches blocks to be energized and detects whether a battery is installed, the kind of the battery, and the remaining battery level. The power-supply control unit 80 also controls the DC-to-DC converter according to the detection results and an instruction of the system control unit 50 and supplies a necessary voltage to the components including the recording medium 200 for a necessary period. When the power switch 72 is operated by the user, the power switch 72 transmits the ON/OFF of the power to the system control unit 50.

Examples of the power supply 30 include primary batteries, such as an alkaline battery and a lithium battery, secondary batteries, such as a nickel-cadmium (NiCd) battery, a nickel-metal hydride (NiMH) battery, and a lithium (Li) battery, and includes an AC adapter. A recording medium I/F 18 is an interface with the recording medium 200, such as a memory card and a hard disk. The recording medium 200 is a nonvolatile recording medium for recording a captured image, such as a memory card. Examples of the recording medium 200 include a semiconductor memory and a magnetic disk.

The flash unit 31 is a light emitting unit that emits light to the subject during exposure to capture an image of the subject at an appropriate illuminance. The LED light emitting unit 33 is used to emit self-timer light, red-eye reducing light, and AF assist light.

Figure 5A:
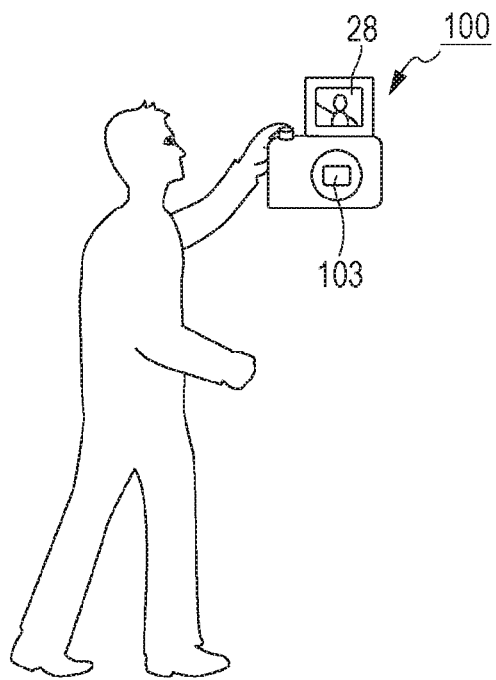
FIG. 5A is a diagram illustrating an example of a state in which a user is taking a picture according to an embodiment of the present invention.
Figure 5B:
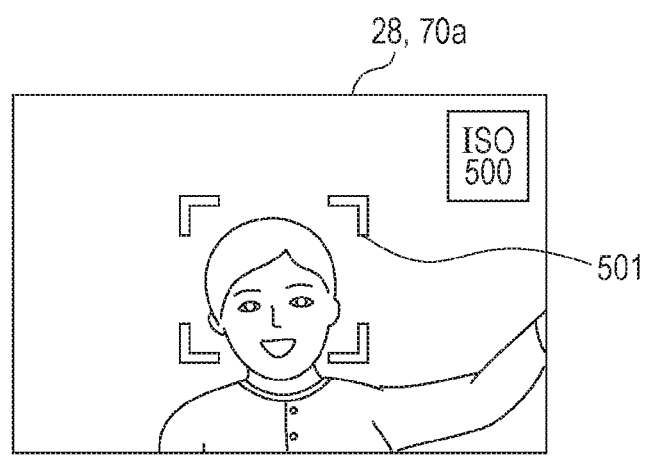
FIG. 5B is a diagram illustrating an example of a state in which a user is taking a picture according to an embodiment of the present invention.

The self-portrait mode will now be described. The self-portrait mode is a shooting mode in which the photographer himself/herself does shooting as a subject, as shown in FIG. 5A. In this mode, skin beautification setting, illuminance setting, background defocus setting, and other effects can be set to allow images with set effects to be recorded. The self-portrait mode is a shooting mode in which the distance between the digital camera 100 and the subject tends to be short because the face or the whole body including the face of the photographer is mainly the subject, as shown in FIGS. 5A and 5B. The self-portrait mode is a shooting mode useful for a case in which the photographer is not the subject and in which effects unique to the self-portrait mode are applied to the subject. However, the main subject is a person, and the distance from the subject is highly likely to be short.

In this embodiment, light emitting conditions for the self-portrait mode are set different from conditions for other modes. The light emitting conditions include the amount of AF assist light, the amount of self-timer light (notification light), and a threshold of illuminance for determining whether to emit AF assist light (a light emission threshold). Since shooting in the self-portrait mode is performed at close range, as described above, emission at a normal amount of light can cause the subject to feel dazzled. However, decreasing the amount of light emission reduces the dazzle (reduces the comfortability). Even if the amount of AF assist light emission is decreased, the probability that an in-focus position cannot be detected in AF processing is low because the subject is present at close range. In other words, decreasing the amount of AF assist light emission (during focus detection) in the self-portrait mode will have little influence on the focusing result in AF processing and prevent the subject from being dazzled, thus reducing comfortability of the user while providing an in-focus image.

Furthermore, for self-timer light emission, the subject is likely to recognize a notification from the self-timer even if the amount of light emission is decreased because the subject is present at close range. In other words, if the amount of AF assist light is decreased in the self-portrait mode, the subject can recognize the light emission but is less likely to feel dazzled. In contrast, in normal shooting in which the subject is not always at close range, decreasing the amount of light emission as in the self-portrait mode can disadvantageously hinder accurate AF processing or prevent the subject from recognizing the self-timer light emission.

Furthermore, in the self-portrait mode, the user performs shooting after checking a subject image and adjusts the angle and the expression, which takes longer time than for normal shooting. For this reason, the instruction of SW1 is given. If the AF assist light is continuously emitted at the same amount of light emission as that in the normal mode during the AF adjustment, the subject would be forced to see the AF assist light during the emission time. Therefore, decreasing the amount of light emission in the self-portrait mode will prevent the subject from feeling dazzled even when the subject has to see the AF assist light for a long time.

Next, a threshold for determining whether to emit AF assist light is described below. The AF assist light is emitted toward a subject when the subject is at an illuminance level lower than a fixed level to allow accurate AF processing (detect an in-focus position). With a lower threshold for determining whether to emit AF assist light, AF assist light is emitted when a darker subject is shot, and with a higher threshold, AF assist light is emitted even if a bright subject is shot. In the self-portrait mode, since the subject is likely to be present at close range, as described above, the range of the position of the subject (the position to be focused) is limited to some extent as compared with that in the other modes. For this reason, even if emission of AF assist light is needed in the other modes, the self-portrait mode does not need AF assist light to detect an in-focus position because the in-focus position is within a limited range (in a narrow range close to the image capturing unit 22). Therefore, decreasing the frequency of emission of the AF assist light in the self-portrait mode will not decrease the accuracy of AF processing and prevent light emission that causes the subject to feel dazzled. Furthermore, in the self-portrait mode, an in-focus position is likely to be within a more limited range than that in the other modes, as described above. Therefore, the focus detection range (the search range) may be limited to, for example, about one meter to two meters from the imaging lens 103. Limiting the focus detection range in this manner allows quick detection of an in-focus position, preventing missing a good opportunity to take a picture.

Figure 3B:
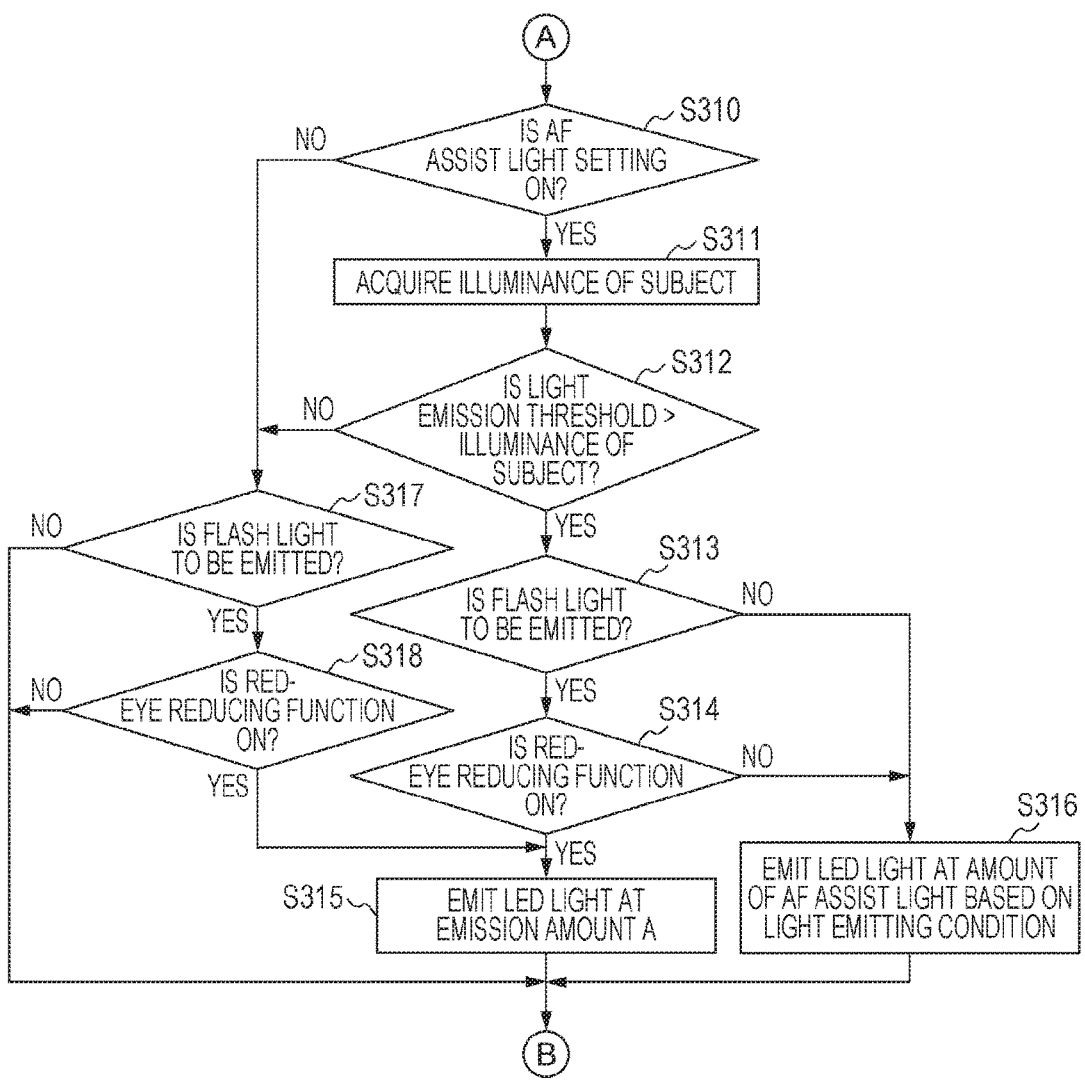
FIG. 3B is flowchart of a process in a shooting mode according to the first embodiment.
Figure 3C:
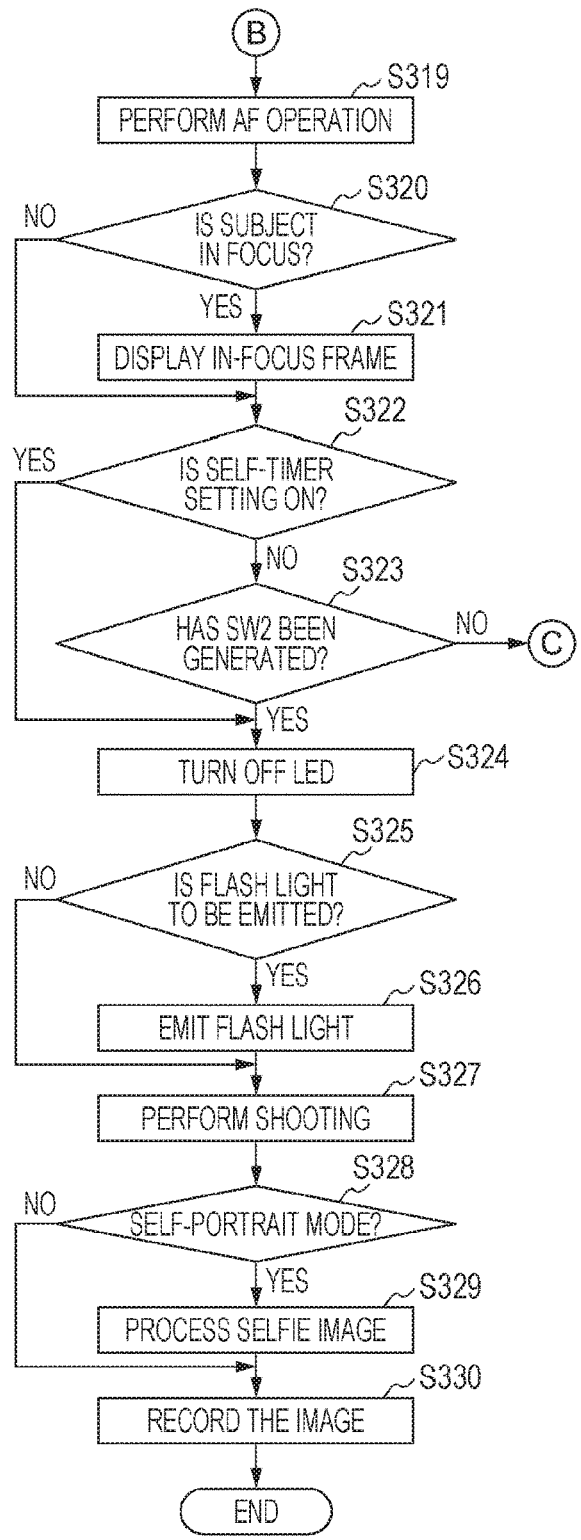
FIG. 3C is a flowchart of a process in a shooting mode according to the first embodiment.

Referring to FIGS. 3A to 3C, a light emission process of this embodiment will be described. This process is implemented by decompressing a program stored in the nonvolatile memory 56 into the system memory 52 and executing the program using the system control unit 50. This process is started when the digital camera 100 is powered on into a shooting mode and is enabled to emit light.

At S301, the system control unit 50 sets the amount of red-eye reducing light, which is light for preventing human eyes from coming out red due to the flash light of the flash unit 31 to an emission amount A and stores the emission amount A in the system memory 52. Examples of the emission amount A of red-eye reducing light include 400 lumens and 500 lumens. The amount A may be set on the menu screen by the user.

At S302, the system control unit 50 determines whether the current shooting mode is a self-portrait mode. If it is determined that the current shooting mode is a self-portrait mode, the system control unit 50 goes to S303, and if not, goes to S304. The determination whether the current shooting mode is a self-portrait mode may be based on whether the self-portrait mode is set using the mode selection switch 60 or the menu screen or reversing of the panel unit 82 (detecting that the panel unit 82 is at a reverse position).

At S303, the system control unit 50 sets light emitting conditions 1. In light emitting conditions 1, the light emission threshold is set to a light emission threshold 1, which is lower than the light emission threshold 2 of a normal shooting mode (a mode other than the self-portrait model so that AF assist light is emitted for a darker subject. In the self-portrait mode, in the case of emitting AF assist light, the system control unit 50 sets an emission amount 1, and in the case of emitting self-timer light, the system control unit 50 sets a self-timer emission amount 1. The emission amount 1 is smaller than the amount of AF assist light emission (an emission amount 2) in the normal mode, and the self-timer emission amount 1 is smaller than self-timer emission amount 2 in the normal mode. For example, if the amounts of light emission 2 in the normal mode are 500 lumens, the amounts of light emission 1 in the self-portrait mode are set to 200 lumens. Examples of the normal mode include an automatic shooting mode, a shooting mode for shooting landscapes or scenery, and a shooting mode for taking a picture of a night view.

At S304, the system control unit 50 sets light emitting conditions 2. In light emitting conditions 2, the light emission threshold is set to the light emission threshold 2. In a normal shooting mode, in the case of emitting AF assist light, the system control unit 50 sets emission amount 2, and in the case of emitting self-timer light, the system control unit 50 sets self-timer emission amount 2. The emission amount 2 may be the same as the emission amount A set at S301 or may be larger or smaller than the emission amount A but is larger than the emission amount 1. If the emission amount 1 is 200 lumens, and the emission amount A is 500 lumens, the emission amount 2 is set to 400 lumens or 500 lumens.

At S305, the system control unit 50 determines whether the shutter button 61 has been half-pressed (that is, whether the first shutter switch signal 62 has been generated). If it is determined that the shutter button 61 has been half-pressed, the system control unit 50 goes to S306, and if not, the system control unit 50 returns to S302.

At S306, the system control unit 50 determines whether the self-timer setting is ON. If it is determined that the self-timer setting is ON, the system control unit 50 goes to S307, and if not, goes to S310. The switching between ON and OFF of the self-timer setting can be set on simple setting displayed on the menu screen or a live view screen displayed during shooting. If the self-timer is ON, the time until shooting can be set to 10 seconds or two seconds. The light of the self-timer is emitted (blinked) by the LED light emitting unit 33 every 0.5 seconds after a shooting instruction is given, and when it is two seconds before shooting, the light is emitted every 0.2 seconds. For the self-portrait mode, the method for emitting the self-timer light may be different from that for the normal mode; the LED light emitting unit 33 may emit light every one second after a shooting instruction is given and may stop light emission when it has reached two seconds before shooting, thereby reducing the number of times of light emission.

At S307, the system control unit 50 determines whether the shutter button 61 has been fully pressed (whether the second shutter switch signal 64 has been generated). If it is determined that the shutter button 61 has been fully pressed, the system control unit 50 goes to S308, and if not, returns to S305.

At S308, the system control unit 50 emits the self-timer light on the basis of the self-timer emission amount 1 or 2 set at S303 or S304. With the configuration in which the self-timer is ON, and light emission is stopped two seconds before shooting, light emission is not performed here, and the system control unit 50 goes to S309.

At S309, the system control unit 50 determines whether the self-timer set time (ten seconds or two seconds) set after the shooting instruction is given at S305. If it is determined that the self-timer set time has elapsed, the system control unit 50 goes to S310, and if not, goes to S308.

At S310, the system control unit 50 determines whether the setting of the AF assist light is ON. If it is determined that the setting of the AF assist light is ON, the system control unit 50 goes to S311, and if not, goes to S317.

At S311, the system control unit 50 acquires the illuminance of the subject and records the illuminance in the system memory 52. The illuminance of the subject may be detected from the illuminance of the subject acquired by the image capturing unit 22 or may be detected from the result of measurement performed by an illuminance measuring unit or the like (not shown).

At S312, the system control unit 50 determines whether the illuminance of the subject detected at S311 is lower than the light emission threshold 1 or 2 set at S303 or S304. If the system control unit 50 determines that the illuminance of the subject is lower than the light emission threshold 1 or 2, the system control unit 50 goes to S313, and if not, goes to S317. In the self-portrait mode, the light emission threshold is lower than that in the normal mode, and the determination at S312 is less likely to be Yes. In other word, the frequency of AF assist light emission is low, and the user is less likely to feel dazzled by the AF assist light in the self-portrait mode.

The process from S313 to S314 is a process for determining whether to emit red-eye reducing light when it is determined at S312 to emit AF assist light. The AF assist light and the red-eye reducing light are emitted from the LED light emitting unit 33 directly before shooting. If it is determined to emit both of the AF assist light and the red-eye reducing light, light for both of the functions of the AF assist light and the red-eye reducing light is emitted, not different light being emitted. If the amount of light emission is decreased as in the case where the emission amount 1 set for the self-portrait mode is small, the function of the AF assist light is not decreased, as described above, but the effect of red-eye reduction would be decreased, degrading the quality of the acquired image. For this reason, the amount of light emission is not decreased. In other word, if it is determined to emit AF assist light, a further determination whether to emit red-eye reducing light is made to determine whether to emit light for reducing the red-eye effect during emission, thereby determining the amount of light emission.

At S313, the system control unit 50 determines whether to emit flash light. Since the red-eye reducing light is emitted during flash light emission, it is determined here whether to emit flash light. The flash unit 31 flashes in the auto mode and when it is determined that the subject is at an illuminance lower than a fixed level, for example, 20 lux, or in the always-on mode. When the flash unit 31 is in the auto mode and when it is determined that the subject is at an illuminance higher than a fixed level, or in the "flash not fired" mode, the flash unit 31 does not emit flash light. If it is determined to emit flash light, the system control unit 50 goes to S314, and if not, goes to S316.

At S314, the system control unit 50 determines whether the red-eye reducing function is ON. If it is determined that the red-eye reducing function is ON, the system control unit 50 goes to S315, and if not, goes to S316.

At S315, the system control unit 50 flashes the LED light emitting unit 33 at the emission amount A set as the amount of red-eye reducing light emission. The red-eye reducing light functions also as the AF assist light.

At S316, the system control unit 50 flashes the LED light emitting unit 33 at the amount of AF assist light emission (the emission amount 1 or the emission amount 2) based on the light emitting condition 1 or 2 set at S303 or S305. Since this light functions as AF assist light, the light is emitted at a small amount of emission in the self-portrait mode.

The following process from S317 to S318 is a process for determining whether to emit red-eye reducing light when it is determined not to emit AF assist light.

The process from S317 to S318 is the same as the process from S313 to S314. However, if it is determined to emit red-eye reducing light, the operation goes to S315, and if not, goes to S319.

At S319, the system control unit 50 performs AF operation to detect an in-focus position. In the self-portrait mode, the system control unit 50 may detect a face and focus on the detected face.

At S320, the system control unit 50 determines whether the subject has come in focus in the AF operation at S319. If it is determined that the subject is in focus, then the system control unit 50 goes to S321, and if not, goes to S322. If a face is detected in the self-portrait mode, the system control unit 50 determines whether the detected face is in focus.

At S321, the system control unit 50 displays, on the display unit 28, an in-focus frame 501 indicating that focus is achieved, as shown in FIG. 5B. If the face detection is performed in the self-portrait mode, the in-focus frame 501 is displayed on the face of the subject.

At S322, the system control unit 50 determines whether the self-timer setting is ON. If it is determined that the self-timer setting is ON, the system control unit 50 goes to S324, and if not, goes to S323. If the self-timer setting is OFF, the system control unit 50 determines at 3323 whether the instruction of SW2 is given because whether to emit AF assist light and red-eye reducing light is determined according to the instruction of SW1 at S305. In contrast, if the self-timer is ON, the system control unit 50 determines whether to emit AF assist light and red-eye reducing light after the self-timer set time has elapsed and then perform shooting without determining whether the instruction of SW2 is given, and therefore goes to S324.

At S323, the system control unit 50 determines whether the shutter button 61 has been fully pressed (whether the second shutter switch signal 64 has been generated). If it is determined that the shutter button 61 has been fully pressed, the system control unit 50 goes to S324, and if not, returns to S305.

At S324, the system control unit 50 turns off the LED light emitting unit 33. This is because the system control unit 50 performs shooting processing (opens the shutter 101 for exposure) at S325 and the subsequent process, and therefore if the LED light emitting unit 33 emits light, unnecessary light enters the subject image, degrading the image quality. If the AF assist light and the red-eye reducing light are not emitted, the system control unit 50 does not turn off the LED light emitting unit 33.

At S325, the system control unit 50 determines whether to emit flash light. If it is determined that flash light is to be emitted, the system control unit 50 goes to S326, and if not, goes to S327.

At S326, the system control unit 50 flashes the flash unit 31. The amount of light emitted by the flash unit 31 is, for example, 3,000 Ws or 2,500 Ws.

At S327, the system control unit 50 performs shooting processing and stores image data acquired by the image capturing unit 22 in the recording medium 200.

At S328, the system control unit 50 determines whether the set shooting mode is the self-portrait mode. If it is the self-portrait mode, the system control unit 50 goes to S329, and if not, goes to S330.

At S329, the system control unit 50 applies effects set by the user to the image data stored in the recording medium 200 at S327 and stores the image data in the memory 32. The effects applied to the subject in the self-portrait mode will be described. Skin beautification setting is a setting for image processing by applying a skin beautification processing (a process for regulating the tone of the skin) on a detected face among the faces in the shooting range so that the skin looks beautiful. In the skin beautification processing, when a face is detected, a range including the eyes, nose, and mouse is detected, and the values of YUV in the detected range is acquired. Deactivating the calculated Y will smooth the skin region, thereby making wrinkles or the like inconspicuous (shading off irregularities, such as wrinkles). Furthermore, averaging the values of UV and applying averaged colors to the skin reduces pigmentation irregularities. Brightness setting is a setting for exposure correction and dimming correction over the entire shooting range to change the brightness. Background defocus setting is a setting for processing an area other than the main face in the shooting range so that the area is blurred. When the background defocus setting is turned ON flash 11 is not emitted. Thus, in the self-portrait mode, effects can be applied to the subject, in particular, to the face. Furthermore, the level of the effects can be set.

At S330, the system control unit 50 stores the image stored in the memory 32 at 327 or 329 in the recording medium 200.

Thus, the embodiment described above prevents the subject from feeling dazzled by re no the amount or frequency of light emission (AF assist light emission), which less influences on the shooting result in the self-portrait mode. The self-portrait mode is generally a shooting mode in which the subject is at close range from the image capturing unit 22, so that the AF position is within a limited range compared with that in the other modes, so that the accuracy of AF processing is little prone to be decreased even if the amount of AF assist light emission is small. Furthermore, although the amount of AF assist light emission is decreased in the self-portrait mode, the amount of red-eye reducing light emission, which influences the image quality, is not decreased in the self-portrait mode, so that the image quality is not decreased.

Second Embodiment

A second embodiment is one same in the configuration of the digital camera 100 as the first embodiment in FIGS. 1A to 1C and FIG. 2. In the first embodiment, the AF assist light, the red-eye reducing light, and the self-timer light are emitted by the LED light emitting unit 33, and the flash light is emitted by the flash unit 31. This is given for mere illustration; the AF assist light, the red-eye reducing light, and the self-timer light may be emitted by the flash unit 31. In the second embodiment, the AF assist light is emitted by the flash unit 31, and the red-eye reducing light is emitted by the LED light emitting unit 33.

Figure 4A:
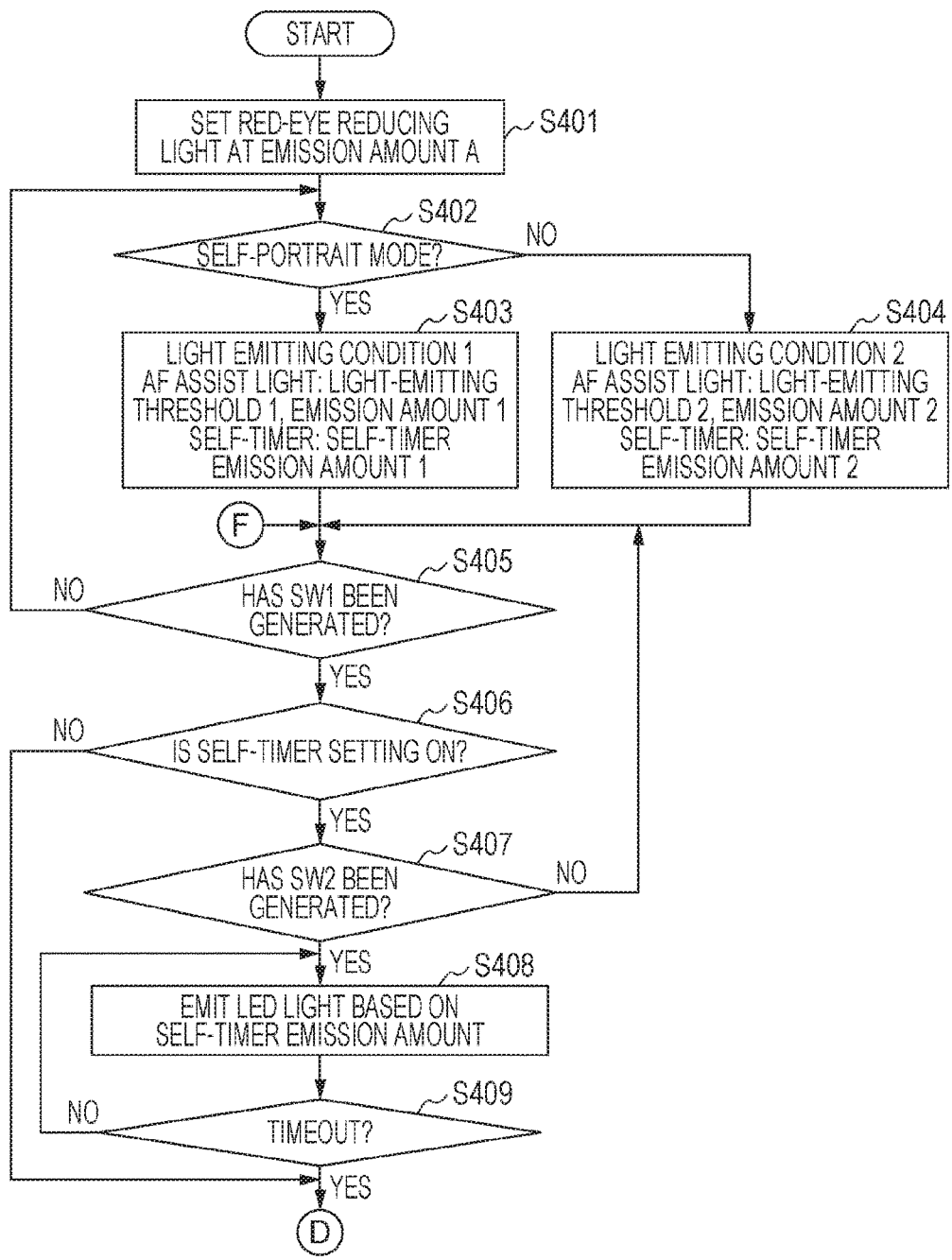
FIG. 4A is a flowchart of a process in a shooting mode according to a second embodiment.
Figure 4B:
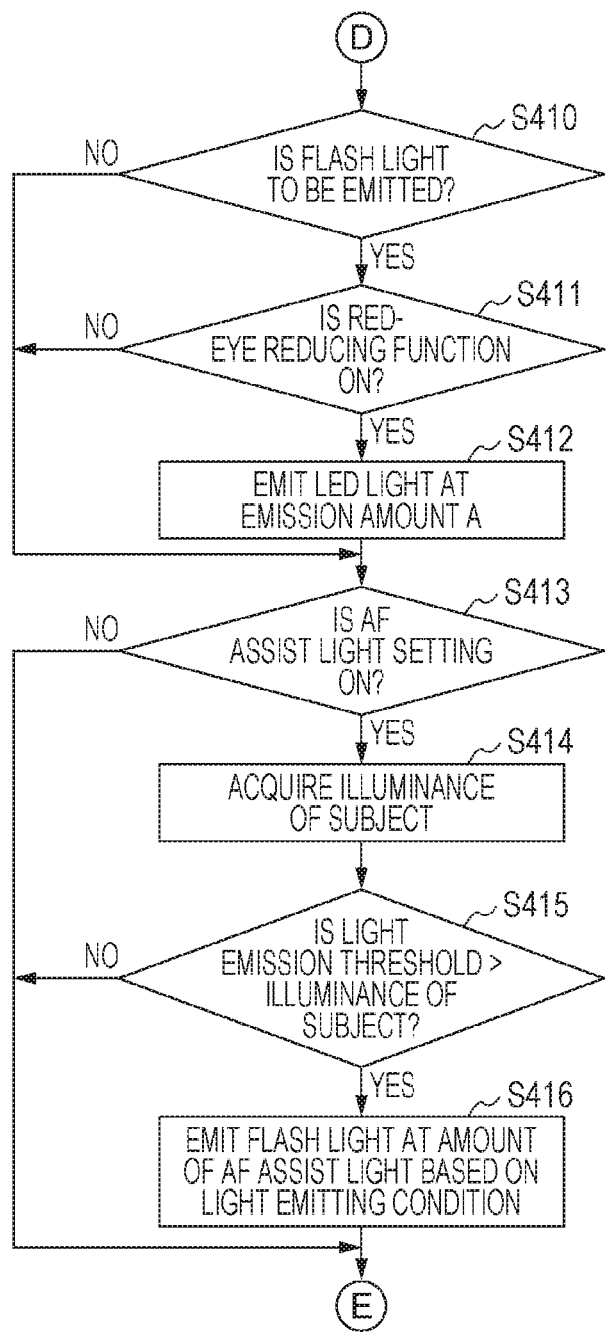
FIG. 4B is flowchart of a process in a shooting mode according to the second embodiment.
Figure 4C:
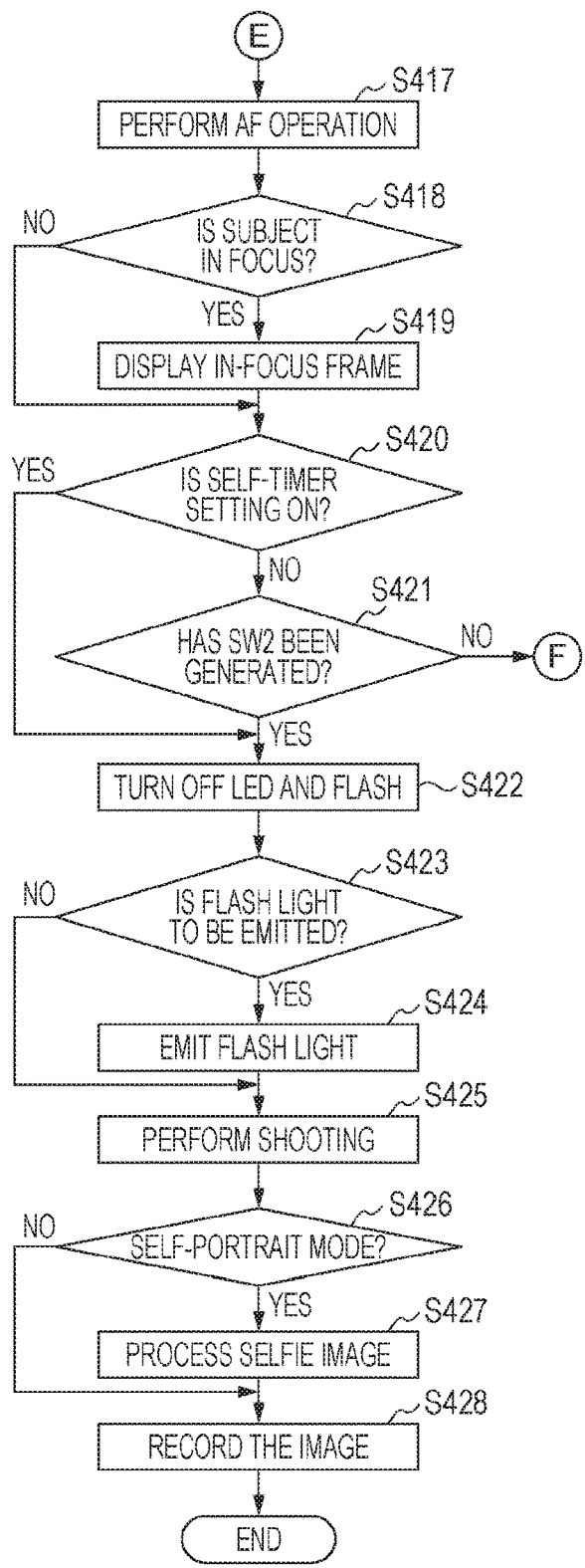
FIG. 4C is a flowchart of a process in a shooting mode according to the second embodiment.

Referring to FIGS. 4A to 4C, light emission processing of this embodiment will be described. This process is implemented by decompressing a program stored in the nonvolatile memory 56 into the system memory 52 and executing the program using the system control unit 50. This process is started when the digital camera 100 is powered on into a shooting mode and is enabled to emit light.

The process from S401 to S409 is the same as that from S301 to S309 in FIG. 3A.

The process from S410 to S412 is the same as that from S313 to S315 in FIG. 3B, which is a process for determining whether to emit the red-eye reducing light.

The process from S413 to S415 is the same as that from S310 to S312 in FIG. 3B, which is a process for determining whether to emit the AF assist light.

At S416, the system control unit 50 flashes the flash unit 31 at the amount of AF assist light emission (the emission amount 1 or the emission amount 2) based on the light emitting condition 1 or 2 set at S403 or S405. In the self-portrait mode, the flash unit 31 is flashed at a small amount of light emission. As mentioned above, the AF assist light is emitted by the flash unit 31, and the red-eye reducing light is emitted by the LED light emitting unit 33. In some embodiments, the AF assist light is emitted by the LED light emitting unit 33, and the red-eye reducing light is emitted by the flash unit 31.

Although the process from S417 to S428 is the same as the process from S319 to S330 in FIG. 3C, not only the LED light emitting unit 33 but also the flash unit 31 are turn off light at S422.

Thus, the embodiment described above prevents the subject from feeling dazzled by reducing the amount or frequency of light emission (AF assist light emission), which less influences on the shooting result in the self-portrait mode. Furthermore, although the amount of AF assist light emission is decreased in the self-portrait mode, the amount of red-eye reducing light emission, which influences the image quality, is not decreased in the self-portrait mode, so that the image quality is not decreased. Furthermore, in the second embodiment, the AF assist light and the red-eye reducing light are independently emitted by different light emitting units, unlike the first embodiment in which light for both of the functions of the red-eye reducing light and the AF assist light is emitted. Consequently, the red-eye reducing light for reducing the red-eye effect is emitted as in the other modes, and the AF assist light is emitted at a smaller amount of light than that in the other modes, preventing the user from feeling dazzled. In the first embodiment, if it is determined that the AF assist light and the red-eye reducing light are to be emitted by the LED light emitting unit 33, light that functions both as the AF assist light and the red-eye reducing light is emitted according to the amount of red-eye reducing light emission. However, in the second embodiment, the AF assist light is emitted by the flash unit 31, and therefore the AF assist light is emitted at a smaller amount than that in a normal mode, and the red-eye reducing light is emitted not at a smaller amount than that in a normal mode.

Modification

In the first and second embodiments, the light emitting condition 1 is set for the self-portrait mode some embodiments, the following conditions are set for determination. When the panel unit 82 is reversed for shooting, as in FIG. 5A, the subject is highly likely to be taking a selfie even if the camera is not in the self-portrait mode. Therefore, the light emitting condition 1 may be set so that the amount or frequency of AF assist light emission is reduced. When it is determined that there is a high probability that the face of the subject is at close range, for example, the size of one of detected faces is one third or more of the shooting region (a predetermined size or larger), the light emitting condition 1 may be set. Furthermore, in a shooting mode other than the self-portrait mode, in which skin beautification processing is used, there is a high probability that shooting is performed from a distance close to the face of the subject, and therefore the light emitting condition 1 may be set. Any of a determination on the self-portrait mode, a determination on the reversing state of the panel unit 82, and a determination whether a face is at close range may be combined, and then the light emitting condition 1 may be set. For example, when the digital camera is in the self-portrait mode, and the panel unit 82 is reversed, the light emitting condition 1 is set, and in other cases, the light emitting condition 2 may be set. In photographing in a mode for taking a picture of a person at close range, photographing with the panel unit reversed, and photographing in response to recognizing a face in the shooting range, the light emitting condition 1 may be set. Since these are highly likely to be shooting the face of the subject at close range, setting the light emitting condition 1 prevents the subject from feeling dazzled, thus reducing the comfortability of the user.

Shooting instructions are given by operating the shutter button 61. Alternatively, shooting instructions may be given by touching operation. Shooting processing is performed in response to the SW1 (a touch on the touch panel 70a) or the SW 2 (off the touch panel 70a). Alternatively, AF assist light or red-eye reducing light may be emitted in response to detecting a touch operation on the touch panel 70a, and then flash light emission or shooting processing may be performed. In giving a shooting instruction using a touch operation, the detected face position may be focused on in the self-portrait mode, the touched position may be focused on in the other modes.

In the above embodiments, shooting of still images has been described. The above embodiments are also applicable to video recording and long exposure shooting.

In the embodiments, the light emitting condition 1 is set for the self-portrait mode, in which the frequency and the amount of light emission are decreased. Alternatively, one of the frequency and the amount may be set to be different from the light emitting condition 2.

In the self-portrait, mode, self-timer emission is decreased. In some embodiments, the self-timer notification is given not by using light emission, but by using sound or display on the display unit 28.

In the first embodiment, the AF assist light is emitted at S315 in FIG. 3B, and in the second embodiment, the AF assist light is emitted at S415 in FIG. 4B. In some embodiments, the AF assist light is emitted during focusing processing. In other words, the AF assist light may be continuously emitted from the time the instruction of SW1 is given until the instruction of SW2 is given. At that time, the red-eye reducing light need only be emitted before flash light emission to reduce the red-eye effect, and short-time emission is enough. Therefore, if the AF assist light and the red-eye reducing light are emitted from the same light source, the lights may be emitted for different periods of time and may play different roles for the individual periods of time. In other words, when a subject face is detected at close range, for example, in the self-portrait mode or when the panel unit 82 is reversed, the AF assist light is emitted under the light emitting condition 1 different from the light emitting condition 2 in response to the instruction of SW1. Subsequently, the red-eye reducing light is emitted from the same light source at the emission amount A for an emission period for reducing the red-eye effect. Emitting the light for different emitting periods of time further reduces dazzle of the user due r the AF assist light.

In the above embodiments, the self-timer light emission has been described as emission of light other than the AF assist light and for giving a notification to the user. Emission for giving a notification to the user is not limited to the self-timer light emission, and the following notifications may be used. For example, a notification indicating that the face of the user has entered the shooting range, a notification indicating that the subject is automatically focused, and a notification indicating the number of user faces in the shooting range using the number of emission times.

Control of the emission control apparatus may be performed by a single piece of hardware or may be a plurality of pieces of hardware.

Having described the present invention as related to the embodiments, it is to be understood that the present invention is not limited to the specific embodiments and that various modifications within the scope and spirit of the invention are also included in the present invention. It should also be understood that the above embodiments are mere examples of the present invention; the embodiments may be combined as appropriate.

The above embodiments have been described using an example in which the present invention is applied to the digital camera 100. This is given for mere illustration; any other light-emission control apparatuses capable of controlling the amount of light emission are applicable. In other words, the present invention is applicable to mobile phones, mobile image viewers, digital photo frames, music players, game machines, electronic book readers, and LED emitting apparatuses and light-emitting apparatuses that flash in cooperation with shooting. The present invention is also applicable to remote controls capable of controlling the above apparatuses.

The present invention enhances ease of shooting by adjusting the amount of light emitted during shooting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of: the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-142506, filed Jul. 16, 2015, which is hereby incorporated by reference herein in its entirety.

What is claimed is:

1. A light-emission control apparatus comprising:
a focus detector configured to detect a focus;
a light emitter configured to emit assist light toward a subject while the focus detector is detecting the focus; and
a memory and at least one processor which function as:
a shooting-mode selecting unit configured to be capable of selecting at least a first shooting mode in which a predetermined correction is applied to a human face of a captured image or a second shooting mode different from the first shooting mode; and
a control unit configured to control an amount of emission of the assist light in the first shooting mode to a smaller amount than an amount of emission of the assist light in the second shooting mode,
wherein the light emitter emits the assist light when an illuminance of the subject is lower than a predetermined illuminance, and
wherein the control unit controls the light emitter in such a manner that, in the first shooting mode, the light emitter emits the assist light when the illuminance of the subject is lower than a first illuminance and does not emit the assist light when the illuminance of the subject is higher than the first illuminance, and in the second shooting mode, the light emitter emits the assist light when the illuminance of the subject is lower than a second illuminance higher than the first illuminance and does not emit the assist light when the illuminance of the subject is higher than the second illuminance.

2. A control method of a light-emission control apparatus, the method comprising:
selecting at least a first shooting mode in which a predetermined correction is applied to a human face of a captured image or a second shooting mode different from the first shooting mode;
detecting a focus;
emitting assist light toward a subject while the focus is detected in the step of detecting the focus; and
controlling an amount of emission of the assist light in the first shooting mode to a smaller amount than an amount of emission of the assist light in the second shooting mode,
wherein the assist light is emitted when an illuminance of the subject is lower than a predetermined illuminance, and
wherein the controlling controls the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

3. A non-transitory computer-readable storage medium storing a program that, when executed by a processor, causes the processor to perform operations comprising:
selecting at least a first shooting mode in which a predetermined correction is applied to a human face of a captured image or a second shooting mode different from the first shooting mode;
detecting a focus;
emitting assist light toward a subject while the focus is detected in the step of detecting the focus; and
controlling an amount of emission of the assist light in the first shooting mode to a smaller amount than an amount of emission of the assist light in the second shooting mode,
wherein the assist light is emitted when an illuminance of the subject is lower than a predetermined illuminance, and
wherein the controlling controls the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

4. A light-emission control apparatus comprising:
a focus detector configured to detect a focus;
a light emitter configured to emit assist light toward a subject while the focus detector is detecting the focus; and
a memory and at least one processor which function as:
a shooting-mode selecting unit configured to be capable of selecting at least a first shooting mode for taking a picture of a person at close range or a second shooting mode different from the first shooting mode; and
a control unit configured to control an amount of emission of the assist light in the first shooting mode to a smaller amount than an amount of emission of the assist light in the second shooting mode
wherein the light emitter emits the assist light when an illuminance of the subject is lower than a predetermined illuminance, and
wherein the control unit controls the light emitter in such a manner that, in the first shooting mode, the light emitter emits the assist light when the illuminance of the subject is lower than a first illuminance and does not emit the assist light when the illuminance of the subject is higher than the first illuminance, and in the second shooting mode, the light emitter emits the assist light when the illuminance of the subject is lower than a second illuminance higher than the first illuminance and does not emit the assist light when the illuminance of the subject is higher than the second illuminance.

5. A control method of a light-emission control apparatus, the method comprising:
selecting at least a first shooting mode for taking a picture of a person at close range or a second shooting mode different from the first shooting mode;
detecting a focus;
emitting assist light toward a subject while the focus is detected in the step of detecting the focus; and
controlling an amount of emission of the assist light in the first shooting mode to a smaller amount than an amount of emission of the assist light in the second shooting mode,
wherein the assist light is emitted when an illuminance of the subject is lower than a predetermined illuminance, and wherein the controlling controls the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

6. A non-transitory computer-readable storage medium storing a program that, when executed by a processor, causes the processor to perform operations comprising:

selecting at least a first shooting mode for taking a picture of a person at close range or a second shooting mode different from the first shooting mode;

detecting a focus;

emitting assist light toward a subject while the focus is detected in the step of detecting the focus; and controlling an amount of emission of the assist light in the first shooting mode to a smaller amount than an amount of emission of the assist light in the second shooting mode, wherein the assist light is emitted when an illuminance of the subject is lower than a predetermined illuminance, and wherein the controlling controls the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

7. A light-emission control apparatus comprising:

a position detector configured to be capable of detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit;

a focus detector configured to detect a focus;

a light emitter configured to emit assist light toward a subject while the focus detector is detecting the focus; and a memory and at least one processor which function as:

a control unit configured, when a specific condition comprising that the position detector has detected that the display unit is at the first position is satisfied, to control an amount of the assist light emitted by the light emitter to a smaller amount than an amount of assist light emitted when the specific condition is not satisfied, wherein the light emitter emits the assist light when an illuminance of the subject is lower than a predetermined illuminance, and wherein the control unit controls the light emitter in such a manner that, when the specific condition is satisfied, the light emitter emits the assist light when the illuminance of the subject is lower than a first illuminance and does not emit the assist light when the illuminance of the subject is higher than the first illuminance, and when the specific condition is not satisfied, the light emitter emits the assist light when the illuminance of the subject is lower than a second illuminance higher than the first illuminance and does not emit the assist light when the illuminance of the subject is higher than the second illuminance.

8. The light-emission control apparatus according to claim 7, wherein the memory and at least one processor further function as:

a recognition unit configured to be capable of recognizing a human face from a captured image;

wherein the specific condition comprises that the recognition unit has detected a human face.

9. A control method of a light-emission control apparatus, the method comprising:

detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit;

detecting a focus;

emitting assist light toward a subject while the focus is detected in the step of detecting the focus; and when a specific condition comprising that the display unit is at the first position is detected in the step of detection is satisfied, controlling an amount of the assist light emitted in the step of emitting the assist light to a smaller amount than an amount of assist light emitted when the specific condition is not satisfied, wherein the assist light is emitted when an illuminance of the subject is lower than a predetermined illuminance, and wherein the controlling controls the emitting of the assist light in such a manner that, when the specific condition is satisfied, the assist light is emitted when the illuminance of the subject is lower than a first illuminance and the assist light is not emitted when the illuminance of the subject is higher than the first illuminance, and when the specific condition is not satisfied, the assist light is emitted when the illuminance of the subject is lower than a second illuminance higher than the first illuminance and the assist light is not emitted when the illuminance of the subject is higher than the second illuminance.

10. A non-transitory computer-readable storage medium storing a program that, when executed by a processor, causes the processor to perform operations comprising:

detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit;

detecting a focus;

emitting assist light toward a subject while the focus is detected in the step of detecting the focus; and when a specific condition comprising that the display unit is at the first position is detected in the step of detection is satisfied, controlling an amount of the assist light emitted in the step of emitting the assist light to a smaller amount than an amount of assist light emitted when the specific condition is not satisfied,
wherein the assist light is emitted when an illuminance of the subject is lower than a predetermined illuminance, and
wherein the controlling controls the emitting of the assist light in such a manner that, when the specific condition is satisfied, the assist light is emitted when the illuminance of the subject is lower than a first illuminance and the assist light is not emitted when the illuminance of the subject is higher than the first illuminance, and when the specific condition is not satisfied, the assist light is emitted when the illuminance of the subject is lower than a second illuminance higher than the first illuminance and the assist light is not emitted when the illuminance of the subject is higher than the second illuminance.

11. A light-emission control apparatus comprising:
a focus detector configured to detect a focus;
a light emitter configured to emit assist light toward a subject while the focus detector is detecting the focus when an illuminance of the subject is lower than a predetermined illuminance; and
a memory and at least one processor which function as:
a shooting-mode selecting unit configured to be capable of selecting at least a first shooting mode in which a predetermined correction is applied to a human face of a captured image or a second shooting mode different from the first shooting mode; and
a control unit configured to control the light emitter in such a manner that, in the first shooting mode, the light emitter emits the assist light when the illuminance of the subject is lower than a first illuminance and does not emit the assist light when the illuminance of the subject is higher than the first illuminance, and in the second shooting mode, the light emitter emits the assist light when the illuminance of the subject is lower than a second illuminance higher than the first illuminance and does not emit the assist light when the illuminance of the subject is higher than the second illuminance.

12. The light-emission control apparatus according to claim 11, wherein the control unit controls an amount of emission of the assist light in the first shooting mode to a smaller amount than an amount of emission of the assist light in the second shooting mode.

13. The light-emission control apparatus according to claim 11, wherein the predetermined correction is a correction for applying a skin beautifying effect.

14. The light-emission control apparatus according to claim 11, wherein the first shooting mode comprises a shooting mode for taking a picture of a person at close range.

15. The light-emission control apparatus according to claim 11, further comprising:
a position detector configured to be capable of detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit,
wherein, when the position detector detects that the display unit is at the first position and specific conditions comprising that the first shooting mode is set are satisfied, the control unit controls the light emitter in such a manner that the light emitter emits the assist light when the illuminance of the subject is lower than the first illuminance and does not emit the assist light when the illuminance of the subject is higher than the first illuminance and
wherein, when the position detector does not detect that the display unit is at the first position and specific conditions are satisfied, the control unit controls the light emitter emits the assist light when the illuminance of the subject is lower than the second illuminance and does not emit the assist light when the illuminance of the subject is higher than the second illuminance.

16. The light-emission control apparatus according to claim 11, further comprising:
a position detector configured to be capable of detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit,
wherein the control unit controls the shooting-mode selecting unit so as to select the first shooting mode in response to detecting that the display unit is at the first position.

17. The light-emission control apparatus according to claim 11, wherein the memory and at least one processor further function as:
a recognition unit configured to be capable of recognizing a human face from a captured image;
wherein, when the recognition unit recognizes a human face and specific conditions comprising that the first shooting mode is set are satisfied, the control unit controls the light emitter in such a manner that the light emitter emits the assist light when the illuminance of the subject is lower than the first illuminance and does not emit the assist light when the illuminance of the subject is higher than the first illuminance and,
wherein, when the recognition unit does not recognizes a human face and specific conditions comprising that the first shooting mode is set are satisfied, the control unit controls the light emitter in such a manner that the light emitter emits the assist light when the illuminance of the subject is lower than the second illuminance and does not emit the assist light when the illuminance of the subject is higher than the second illuminance.

18. The light-emission control apparatus according to claim 11, wherein the first shooting mode comprises a self-portrait mode.

19. The light-emission control apparatus according to claim 11, wherein the second shooting mode comprises at least one of an automatic shooting mode and a shooting mode for shooting a landscape.

20. The light-emission control apparatus according to claim 11, wherein a range in which the focus detector detects the focus in the first shooting mode is smaller than a range in which the focus detector detects the focus in the second shooting mode and at close range.

21. The light-emission control apparatus according to claim 11,
wherein the light emitter is capable of emitting light for reducing a red-eye effect, and
wherein the control unit controls light emission for reducing the red-eye effect at a same amount in the first shooting mode and in the second shooting mode.

22. A control method of a light-emission control apparatus, the method comprising:
  detecting a focus;
  emitting assist light toward a subject while detecting the focus when an illuminance of the subject is lower than a predetermined illuminance; and
  selecting at least a first shooting mode in which a predetermined correction is applied to a human face of a captured image or a second shooting mode different from the first shooting mode; and
  controlling the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

23. A non-transitory computer-readable storage medium storing a program that, when executed by a processor, causes the processor to perform operations comprising:
  detecting a focus;
  emitting assist light toward a subject while detecting the focus when an illuminance of the subject is lower than a predetermined illuminance; and
  selecting at least a first shooting mode in which a predetermined correction is applied to a human face of a captured image or a second shooting mode different from the first shooting mode; and
  controlling the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

24. A light-emission control apparatus comprising:
  a focus detector configured to detect a focus;
  a light emitter configured to emit assist light toward a subject while the focus detector is detecting the focus when an illuminance of the subject is lower than a predetermined illuminance; and
  a memory and at least one processor which function as:
  a shooting-mode selecting unit configured to be capable of selecting at least a first shooting mode for taking a picture of a person at close range or a second shooting mode different from the first shooting mode; and
  a control unit configured to control the light emitter in such a manner that, in the first shooting mode, the light emitter emits the assist light when the illuminance of the subject is lower than a first illuminance and does not emit the assist light when the illuminance of the subject is higher than the first illuminance, and in the second shooting mode, the light emitter emits the assist light when the illuminance of the subject is lower than a second illuminance higher than the first illuminance and does not emit the assist light when the illuminance of the subject is higher than the second illuminance.

25. A control method of a light-emission control apparatus, the method comprising:
  detecting a focus;
  emitting assist light toward a subject while the focus detector is detecting the focus when an illuminance of the subject is lower than a predetermined illuminance; and
  selecting at least a first shooting mode for taking a picture of a person at close range or a second shooting mode different from the first shooting mode; and
  controlling the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

26. A non-transitory computer-readable storage medium storing a program that, when executed by a processor, causes the processor to perform operations comprising:
  detecting a focus;
  emitting assist light toward a subject while the focus detector is detecting the focus when an illuminance of the subject is lower than a predetermined illuminance; and
  selecting at least a first shooting mode for taking a picture of a person at close range or a second shooting mode different from the first shooting mode; and
  controlling the emitting of the assist light in such a manner that, in the first shooting mode, the assist light is emitted when the illuminance of the subject is lower than a first illuminance and the assist light is not emitted when the illuminance of the subject is higher than the first illuminance, and in the second shooting mode, the assist light is emitted when the illuminance of the subject is lower than a second illuminance higher than the first illuminance and the assist light is not emitted when the illuminance of the subject is higher than the second illuminance.

27. A light-emission control apparatus comprising:
  a position detector configured to be capable of detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit;
  a focus detector configured to detect a focus;
  a light emitter configured to emit assist light toward a subject while the focus detector is detecting the focus when an illuminance of the subject is lower than a predetermined illuminance; and
  a memory and at least one processor which function as:
  a control unit configured to control the light emitter in such a manner that, when the specific condition is satisfied, the light emitter emits the assist light when the illuminance of the subject is lower than a first illuminance and does not emit the assist light when the illuminance of the subject is higher than the first illuminance, and when the specific condition is not satisfied, the light emitter emits the assist light when the illuminance of the subject is lower than a second illuminance higher than the first illuminance and does not emit the assist light when the illuminance of the subject is higher than the second illuminance.

28. The light-emission control apparatus according to claim 27, wherein the memory and at least one processor further function as:
a recognition unit configured to be capable of recognizing a human face from a captured image;
wherein the specific condition comprises that the recognition unit has detected a human face.

29. A control method of a light-emission control apparatus, the method comprising:
detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit;
detecting a focus;
emitting assist light toward a subject while the focus detector is detecting the focus when an illuminance of the subject is lower than a predetermined illuminance; and
controlling the emitting of the assist light in such a manner that, when the specific condition is satisfied, the assist light is emitted when the illuminance of the subject is lower than a first illuminance and the assist light is not emitted when the illuminance of the subject is higher than the first illuminance, and when the specific condition is not satisfied, the assist light is emitted when the illuminance of the subject is lower than a second illuminance higher than the first illuminance and the assist light is not emitted when the illuminance of the subject is higher than the second illuminance.

30. A non-transitory computer-readable storage medium storing a program that, when executed by a processor, causes the processor to perform operations comprising:
detecting whether a position of a display unit rotatable with respect to a main body of the light-emission control apparatus relative to the main body is a first position at which a display direction of the display unit is same as a shooting direction of an image capturing unit or a second position at which the display direction of the display unit differs from the shooting direction of the image capturing unit;
detecting a focus;
emitting assist light toward a subject while the focus detector is detecting the focus when an illuminance of the subject is lower than a predetermined illuminance; and
controlling the emitting of the assist light in such a manner that, when the specific condition is satisfied, the assist light is emitted when the illuminance of the subject is lower than a first illuminance and the assist light is not emitted when the illuminance of the subject is higher than the first illuminance, and when the specific condition is not satisfied, the assist light is emitted when the illuminance of the subject is lower than a second illuminance higher than the first illuminance and the assist light is not emitted when the illuminance of the subject is higher than the second illuminance.

* * * * *